United States Patent
Tanabe

(10) Patent No.: US 8,680,715 B2
(45) Date of Patent: Mar. 25, 2014

(54) POWER SUPPLYING DEVICE, CONTROL METHOD FOR THE SAME, AND POWER-SUPPLYING SYSTEM

(75) Inventor: Akihiro Tanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 517 days.

(21) Appl. No.: 13/057,603

(22) PCT Filed: May 7, 2010

(86) PCT No.: PCT/JP2010/058139
§ 371 (c)(1),
(2), (4) Date: Feb. 4, 2011

(87) PCT Pub. No.: WO2010/131723
PCT Pub. Date: Nov. 18, 2010

(65) Prior Publication Data
US 2011/0260532 A1   Oct. 27, 2011

(30) Foreign Application Priority Data

May 13, 2009 (JP) .................................. 2009-117041
Apr. 28, 2010 (JP) .................................. 2010-104233

(51) Int. Cl.
*H01F 27/42* (2006.01)
(52) U.S. Cl.
USPC ......................................... 307/104; 307/140
(58) Field of Classification Search
USPC ................................................ 307/104, 140
See application file for complete search history.

(56) References Cited

U.S. PATENT DOCUMENTS

| | | | |
|---|---|---|---|
| 6,243,240 B1 | 6/2001 | Ozue et al. |
| 6,429,992 B1 | 8/2002 | Ozue et al. |
| 6,529,127 B2 | 3/2003 | Townsend et al. |
| 6,788,486 B1 | 9/2004 | Sakai |
| 8,098,684 B2 | 1/2012 | Schopfer et al. |
| 2005/0068009 A1 | 3/2005 | Aoki |
| 2005/0140482 A1 | 6/2005 | Cheng et al. |
| 2007/0139000 A1 | 6/2007 | Kozuma et al. |
| 2009/0003481 A1 | 1/2009 | Schopfer et al. |
| 2011/0244794 A1 | 10/2011 | Nakano |
| 2011/0264297 A1 | 10/2011 | Nakano |

FOREIGN PATENT DOCUMENTS

| | | |
|---|---|---|
| CN | 1912786 A | 2/2007 |
| CN | 1917331 A | 2/2007 |
| CN | 101233666 A | 7/2008 |
| JP | 09-103037 A | 4/1997 |
| JP | 11-098706 A | 4/1999 |
| JP | 11-168837 A | 6/1999 |

(Continued)

OTHER PUBLICATIONS

The above references were cited in a Supplementary European Search Report issued on Aug. 14, 2013, which is enclosed, that issued in the corresponding European Patent Application No. 10774980.6.

(Continued)

*Primary Examiner* — Robert L. Deberadinis
(74) *Attorney, Agent, or Firm* — Cowan, Liebowitz & Latman, P.C.

(57) ABSTRACT

Even when power is to be simultaneously supplied to a plurality of power-supplied devices by using one primary coil, it is possible to properly supply power to the respective power-supplied devices. More specifically, a power-supplying device stops non-contact power supply in accordance with the detection of a plurality of power-supplied devices set in a power supply area.

11 Claims, 7 Drawing Sheets

(56) References Cited

FOREIGN PATENT DOCUMENTS

| | | |
|---|---|---|
| JP | 2005-110399 A | 4/2005 |
| JP | 2005-192392 A | 7/2005 |
| JP | 2006-081249 A | 3/2006 |
| JP | 2006-211050 A | 8/2006 |
| JP | 2006-246633 A | 9/2006 |
| JP | 2006-314181 A | 11/2006 |
| JP | 2007-089341 A | 4/2007 |
| JP | 2007-148564 A | 6/2007 |
| JP | 2008-206297 A | 9/2008 |
| WO | 2005/109597 A1 | 11/2005 |

OTHER PUBLICATIONS

The above references were cited in a Aug. 30, 2013 European Search Report which is enclosed of the counterpart European Patent Application No. 10774985.5, which is a counterpart application of the related U.S. Appl. No. 13/062,433.

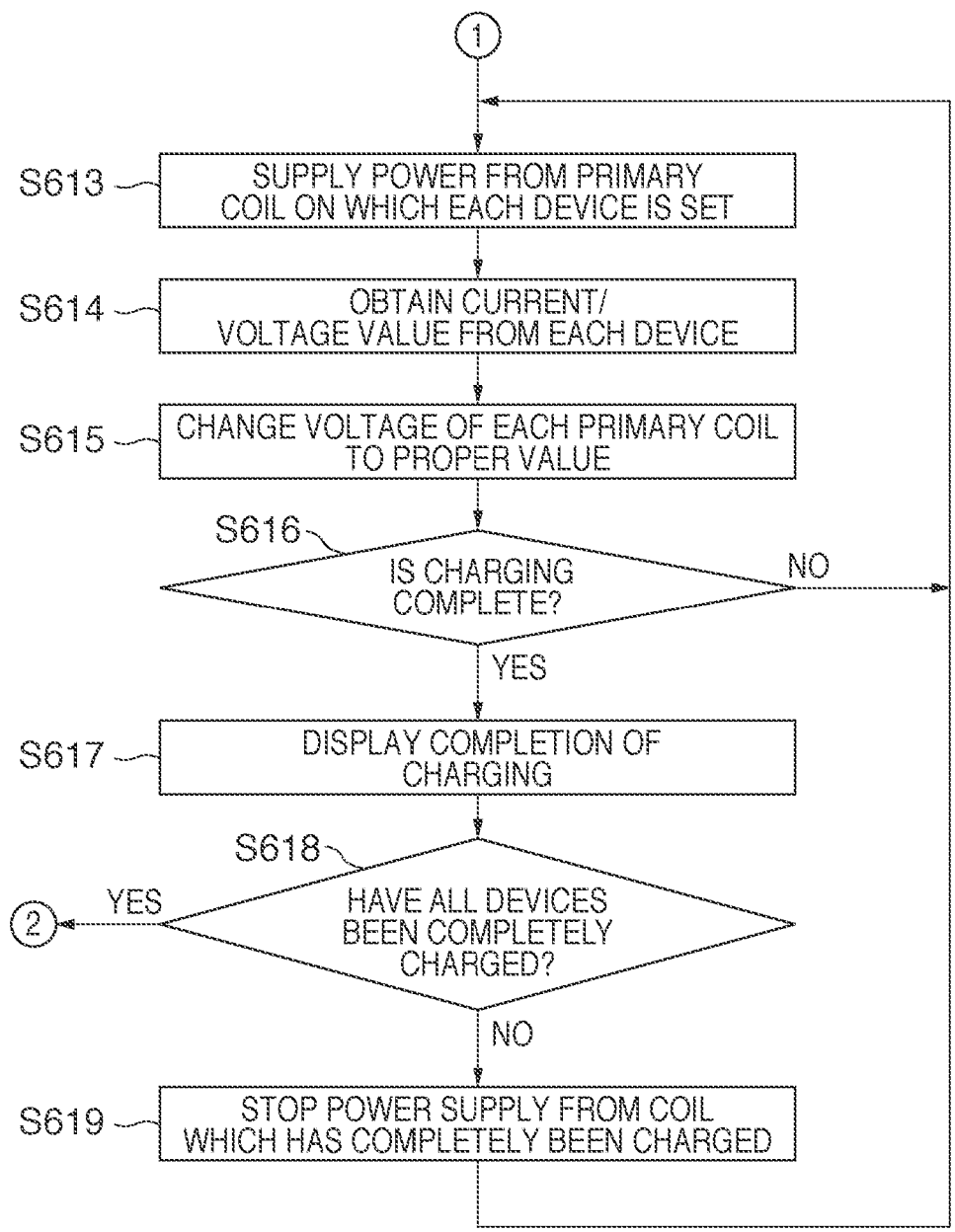

FIG. 7

|  | DIGITAL CAMERA (801) | CELLULAR PHONE (802) |
|---|---|---|
| 803 DEVICE NAME | ABC001 | XYZ505 |
| 804 MAKER NAME | ○○ | △□ |
| 805 ALLOWABLE VOLTAGE VALUE (MIN) | 6V | 5V |
| 806 ALLOWABLE VOLTAGE VALUE (MAX) | 8V | 6.5V |
| 807 ALLOWABLE CURRENT VALUE (MIN) | 500mA | 300mA |
| 808 ALLOWABLE CURRENT VALUE (MAX) | 1A | 600mA |

US 8,680,715 B2

POWER SUPPLYING DEVICE, CONTROL METHOD FOR THE SAME, AND POWER-SUPPLYING SYSTEM

TECHNICAL FIELD

The present invention relates to a power-supplying device, a control method for the same, and a power-supplying system.

BACKGROUND ART

Conventionally, there has been known a power-supplying device that supplies power to a power-supplied device in a non-contact manner by using electromagnetic induction. Such a power-supplying device uses a mechanism to generate an electromotive force on the secondary coil side of a power-supplied device by feeding a current to the primary coil side. By using this electromagnetic induction to supply power, the displacement between the primary coil and the secondary coil will become the less power efficiency or cause excessive power supply. For this reason, Japanese Patent Laid-Open No. 9-103037 discloses a method to control the power to be supplied, based on the information received from a power-supplied device.

The above conventional technique, however, is not based on the assumption that power is simultaneously supplied to a plurality of power-supplied devices in a non-contact manner by using one primary coil. Assume a situation in which power is simultaneously supplied to a plurality of power-supplied devices in a non-contact manner by using one primary coil. In this case, in order to properly supply power to the respective power-supplied devices, it is necessary to control power to be supplied in accordance with the power-supplied devices with different allowable amounts associated with power supply, for example, allowable voltage and current values.

SUMMARY OF INVENTION

The present invention has been made in consideration of the above problems in the prior art. The present invention provides a power-supplying device, which can properly supply power to each power-supplied device even if power is simultaneously supplied to the respective power-supplied devices in a non-contact manner by using one primary coil, a control method for the power-supplying device, and a power-supplying system.

The present invention in its first aspect provides a power-supplying device including a plurality of primary coils comprising: power supply means for supplying power in a non-contact manner from each of the plurality of primary coils to at least one power-supplied device set in a power supply area of each of the plurality of primary coils; detecting means for detecting whether a plurality of power-supplied devices are set in the power supply area of one of the plurality of primary coils; and controlling means for controlling the power supply means to stop supplying power from the one of the plurality of primary coils on which the plurality of power-supplied devices are detected to be set, when the detecting means detects that the plurality of power-supplied devices are set in the power supply area of the one of the plurality of primary coils.

Further features of the present invention will become apparent from the following description of exemplary embodiments with reference to the attached drawings.

BRIEF DESCRIPTION OF DRAWINGS

FIGS. 6A and 6B are flowcharts showing processing in the power-supplying device according to this embodiment;

FIG. 7 is a view showing an example of information obtained from power-supplied devices and stored in a memory.

DESCRIPTION OF EMBODIMENTS

An embodiment of the present invention will be described below with reference to the accompanying drawings. However, the embodiment of the present invention exemplifies a preferred embodiment of the present invention, and does not limit the scope of the invention.

Figure 1:
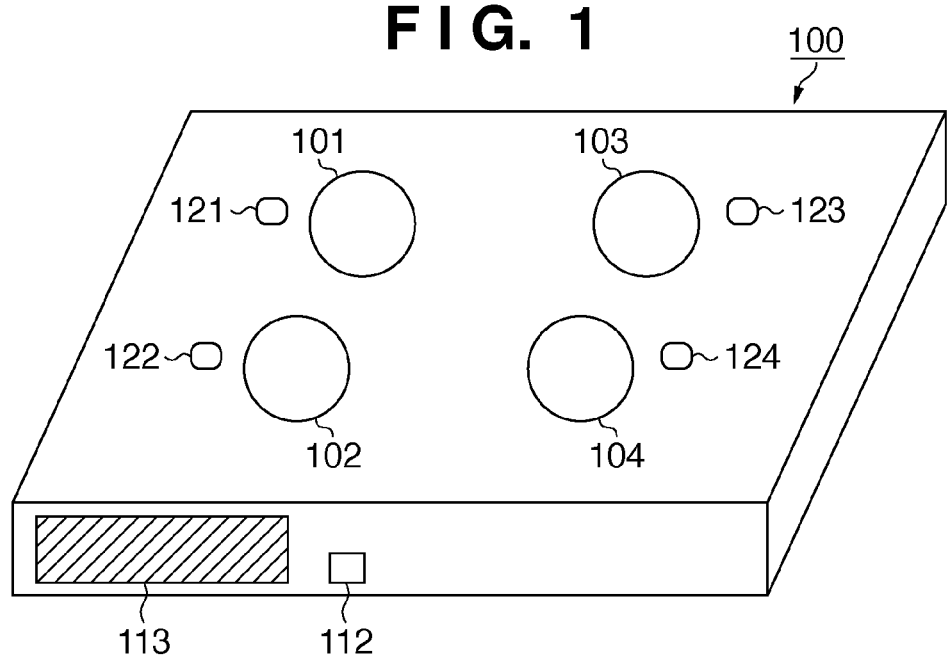
FIG. 1 is a perspective view showing the external arrangement of a power-supplying device according to this embodiment.

FIG. 1 is a perspective view showing the external arrangement of a non-contact type power-supplying device 100 according to this embodiment. As shown in FIG. 1, the power-supplying device 100 includes power supply communication units 101 to 104 each having a power supply function and a communication function. That is, the power-supplying device 100 includes a plurality of power supply communication units each having one primary coil for supplying power to an external device having a secondary coil. The power-supplying device 100 supplies power, in a non-contact manner, to external devices set in the magnetic fields (power supply areas) generated by the primary coils of the four power supply communication units by generating an electromotive force in the secondary coils of the external devices utilizing an electromagnetic induction. The external devices which receive power supplied from the power-supplying device 100 (in the following description, external devices which receive supplied power will be referred to as power-supplied devices) can charge rechargeable batteries in their main bodies by this power supply. Note that when a plurality of power-supplied devices are set in the magnetic field generated by one primary coil, the power-supplying device 100 can supply power to the power-supplied devices. This embodiment uses the electromagnetic induction scheme as a scheme of supplying power in a non-contact manner. However, it is possible to use any scheme, for example, a magnetic field resonance scheme (magnetic resonance scheme), which is designed to supply power in a non-contact manner by generating power in the coil which a power-supplied device has, using the magnetic field (magnetic force) generated by a coil of a power-supplying device.

The power-supplying device 100 includes an LED 112 and LCD 113 for notifying the user of messages indicating an error during supplying the power, a change of power supply status, and "charge completion" that indicates the completion of charging of the rechargeable battery of a power-supplied device. Magnetic sensors 121 to 124 such as hall devices are set near the power supply communication units 101 to 104, respectively. When the magnetic sensor 121 to 124 detect changes in magnetic flux, the power-supplying device 100 detects that power-supplied devices are set in the power supply areas of the power supply communication units 101 to 104. By determining which one of the magnetic sensors 121 to 124 has detected a change in magnetic flux, the power-supplying device 100 can also determine in which one of the power supply areas of the power supply communication units 101 to 104 a power-supplied device is set.

Figure 2:
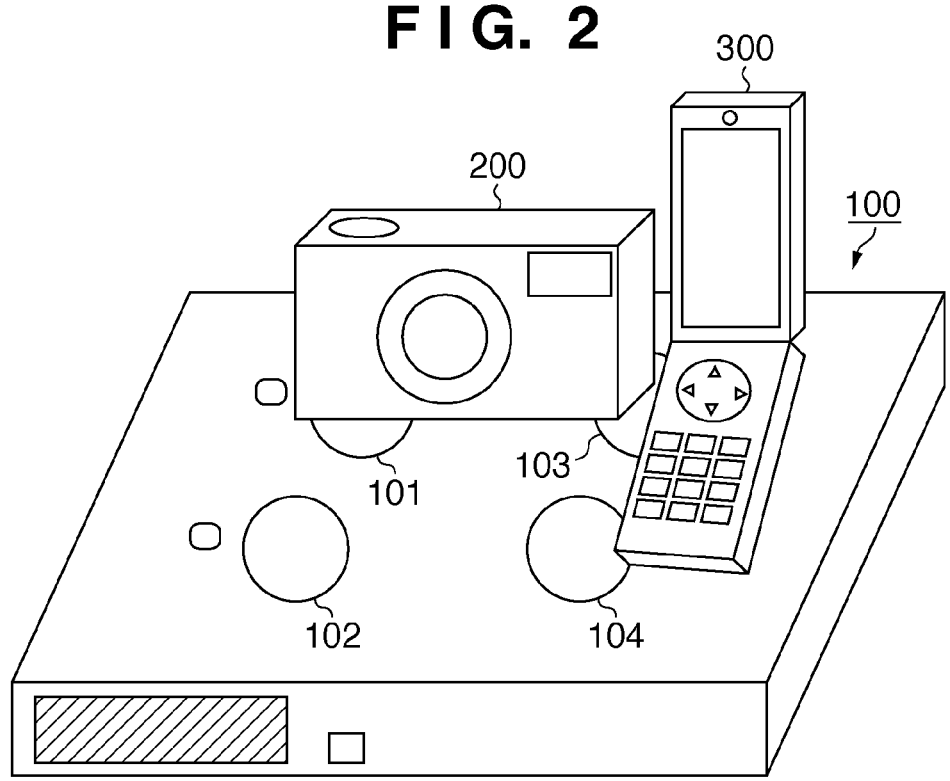
FIG. 2 is a perspective view showing an example of a system configuration including a power-supplying device according to this embodiment and power-supplied devices.

FIG. 2 is a perspective view showing an example of the system configuration constituted by the power-supplying device 100 and power-supplied devices. In the system configuration exemplified by FIG. 2, a digital camera 200 and a cellular phone 300 as power-supplied devices are set on the power-supplying device 100 shown in FIG. 1.

Both the digital camera 200 and the cellular phone 300 incorporate rechargeable batteries which can be charged and secondary coils for receiving power supplied from the power-supplying device 100 in non-contact manner, and are compatible with a method of charging rechargeable batteries by utilizing an electromagnetic induction. In the example shown in FIG. 2, the digital camera 200 is set in the power supply areas of the power supply communication units 101 and 103, and receives power from the power supply communication units 101 and 103. The cellular phone 300 is set in the power supply areas of the power supply communication units 103 and 104, and receive power from the power supply communication units 103 and 104.

The digital camera 200 obtains information such as a control signal from the power-supplying device 100 by detecting, via the secondary coil, the magnetic fluxes generated in the primary coils by the communication circuits of the power supply communication units 101 and 103. The digital camera 200 also rectifies the AC power generated in the secondary coil by the magnetic fluxes generated in the primary coils by the power supply circuits of the power supply communication units 101 and 103, and receives power from the power-supplying device 100. Likewise, the cellular phone 300 obtains information such as a control signal from the power-supplying device 100 by detecting, via the secondary coil, the magnetic fluxes generated in the primary coils by the communication circuits of the power supply communication units 103 and 104. The cellular phone 300 also rectifies the AC power generated in the secondary coil by the magnetic fluxes generated in the primary coils by the power supply circuits of the power supply communication units 103 and 104, and receives power from the power-supplying device 100.

Although this embodiment has exemplified a digital camera and a cellular phone as power-supplied devices, power-supplied devices are not limited to these devices. Power-supplied devices may be any devices to and with which the power supply communication units 101 to 104 of the power-supplying device 100 can supply power and communicate.

Figure 3:
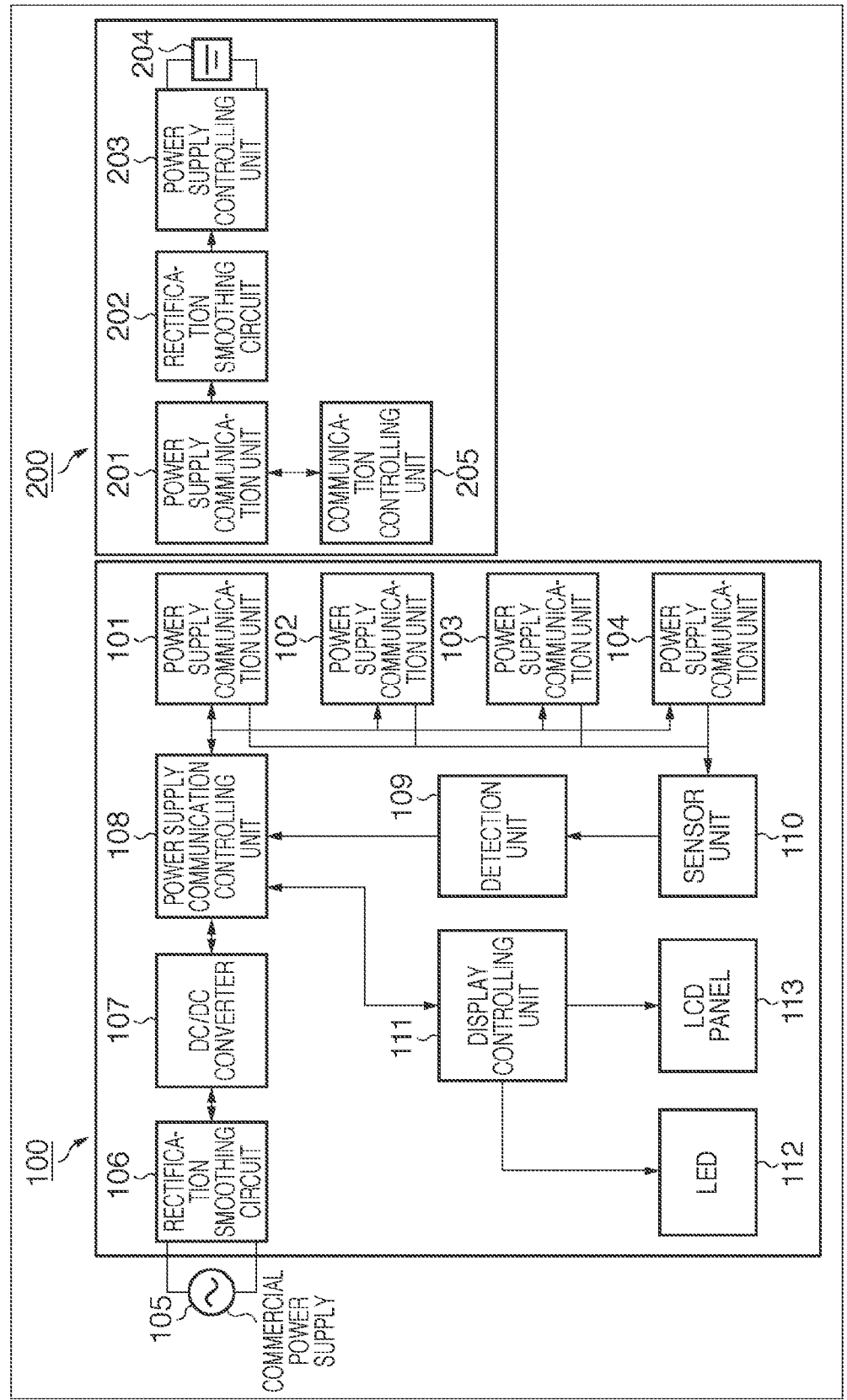
FIG. 3 is a block diagram showing the internal arrangements of the power-supplying device according to this embodiment and power-supplied device.

FIG. 3 is a block diagram showing the internal arrangements of the power-supplying device 100 and digital camera 200 as a power-supplied device according to this embodiment. As shown in FIG. 3, the power-supplying device 100 includes the power supply communication units 101, 102, 103, and 104, a commercial power supply 105, a rectification smoothing circuit 106, a DC/DC converter 107, and a power supply communication controlling unit 108. The power-supplying device 100 further includes a detection unit 109, a sensor unit 110, a display controlling unit 111, the LED 112, and the LCD 113. The digital camera 200 as a power-supplied device includes a power supply communication unit 201, a rectification smoothing circuit 202, a power supply controlling unit 203, a rechargeable battery 204, and a communication controlling unit 205.

Figure 4:
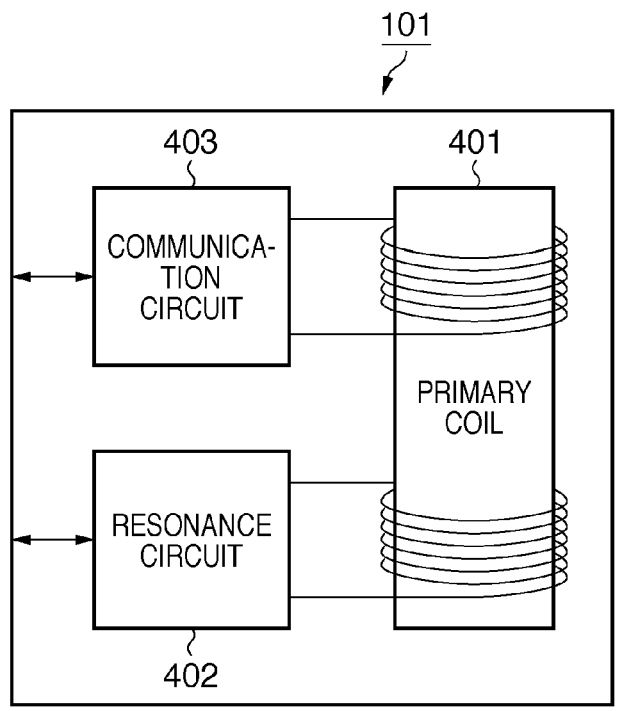
FIG. 4 is a view showing the details of a power supply communication unit in the power-supplying device according to this embodiment.

The details of the power supply communication units 101 to 104 will be described in detail first with reference to FIG. 4. FIG. 4 is a view showing the details of the power supply communication unit 101. As shown in FIG. 4, the power supply communication unit 101 includes primary coils 401, a resonance circuit 402, and a communication circuit 403.

The primary coils 401 are two coils respectively serving for communication and power supply, and generate magnetic fluxes by being excited by the resonance circuit 402 and the communication circuit 403. Upon receiving a control instruction from the power supply communication controlling unit 108 shown in FIG. 3, the resonance circuit 402 generates a magnetic flux for power supply by exciting the primary coil 401. Upon receiving a control instruction from the power supply communication controlling unit 108, the communication circuit 403 generates a magnetic flux for signal transfer by exciting the primary coil 401.

The communication circuit 403 causes the primary coil 401 to generate a magnetic flux, with information based on the control instruction received from the power supply communication controlling unit 108 being superimposed on a magnetic flux pattern for signal transfer. This can generate an electromotive force based on the magnetic flux in the secondary coil of the digital camera 200 as a power-supplied device. The communication controlling unit 205 of the digital camera 200 can detect the electromotive force and obtain the information superimposed on the magnetic flux. As described above, the power-supplying device 100 can communicate with a power-supplied device by using the magnetic flux for signal transfer which is generated in the primary coil 401. In contrast to this, the communication circuit 403 can detect the electromotive force generated when the primary coil 401 is excited by the magnetic flux for signal transfer which is generated in the secondary coil of a power-supplied device, and also can detect the information superimposed on the magnetic flux pattern. This makes it possible for the power-supplying device 100 to receive information from a power-supplied device.

The communication circuit 403 causes the primary coil 401 to generate a magnetic flux, with a magnetic flux for power transfer and a magnetic flux for signal transfer being superimposed in a generated oscillating magnetic flux, by transmitting a signal at a frequency different from that of the resonance circuit 402. Although the power supply communication unit 101 has been exemplified in the description referring to FIG. 4, the power supply communication units 102, 103, 104, and 201 have the same arrangement. Note that the power supply communication unit 201 of the digital camera 200 as a power-supplied device uses the primary coil 401 as a secondary coil. Note, therefore, that the power supply communication units of a power-supplying device and power-supplied device each having the primary coil 401 or a secondary coil will be described as different units.

As shown in FIG. 3, the rectification smoothing circuit 106 rectifies and smoothes an AC voltage from the commercial power supply 105, and applies a DC voltage to the DC/DC converter 107. The DC/DC converter 107 converts the input DC voltage into a predetermined voltage and sends it to the power supply communication controlling unit 108.

The power supply communication controlling unit 108 includes a microcontroller and a memory and comprehensively controls each unit of the power-supplying device 100. Note that the power supply communication controlling unit 108 includes a microcontroller, an internal RAM, and an internal ROM (none of which are shown). The power supply communication controlling unit 108 performs control to determine whether to output the DC voltage sent from the DC/DC converter 107 to each of the power supply communication units 101 to 104. Upon determining to output the DC voltage, the power supply communication controlling unit 108 outputs it by turning on a switch for controlling each power supply communication unit.

The power supply communication units 101 to 104 each excite the primary coil based on the DC voltage applied from the DC/DC converter 107 via the power supply communication controlling unit 108 to transfer power to the digital camera 200 in a non-contact manner by using electromagnetic induction.

More specifically, the resonance circuit 402 converts the DC voltage into an AC current to generate an AC magnetic field, that is, an oscillating magnetic flux, in the primary coil 401. This generates an electromotive force due to electromagnetic induction in the secondary coil which the digital camera 200 has, thereby supplying power to the digital camera 200. The communication circuits 403 of the power supply communication units 101 to 104 each transmit a predetermined control instruction to the digital camera 200 upon superimposing predetermined information on the instruction, when exciting the primary coil, in accordance with a control instruction from the power supply communication controlling unit 108. That is, the communication circuit 403 generates an oscillating magnetic flux for signal transfer in the primary coil 401 to generate an electromotive force corresponding to the oscillating magnetic flux for signal transfer in the secondary coil of the digital camera 200, thereby transferring information to the digital camera 200. Each communication circuit 403 obtains predetermined information from the induced electromotive force generated in the primary coil 401 using the magnetic flux generated in the secondary coil of the digital camera 200.

The detection unit 109 detects, via the communication circuit 403, the voltage or current of the induced electromotive force generated in the primary coil of each of the power supply communication units 101 to 104. The detection unit 109 also obtains sensor information from the sensor unit 110 and transfers the obtained information to the power supply communication controlling unit 108. The sensor unit 110 is a sensor such as a hall device which measures the strength of a magnetic field. More specifically, the sensor unit 110 includes the magnetic sensor 121 to 124 properly set on the power-supplying device 100, detects that power-supplied devices are set on the power supply communication units 101 to 104, and outputs the detected information as sensor information to the detection unit 109.

The display controlling unit 111 controls display on the LED 112 and LCD 113 under the control of the power supply communication controlling unit 108. More specifically, upon receiving predetermined event information from the power supply communication controlling unit 108, the display controlling unit 111 receives a display image corresponding to the event information from the ROM which the power supply communication controlling unit 108 has, and causes the LCD 113 to display the image. Alternatively, the display controlling unit 111 turns the light on the LED 112 in accordance with event information from the power supply communication controlling unit 108. With this operation, the power-supplying device 100 notifies the user of a message indicating a power supply error, a change in power supply status ("during power supply" or "power supply paused" or "charge completion").

In the digital camera 200, as the magnetic flux generated by the primary coil of one of the power supply communication units 101 to 104 of the power-supplying device 100 changes, an electromotive force is generated in the secondary coil of the power supply communication unit 201. As a result, a current flows. Since the voltage (AC) generated in the secondary coil of the power supply communication unit 201 is not stable, the rectification smoothing circuit 202 rectifies and smoothes the voltage, converts it into a DC voltage, and applies it to the power supply controlling unit 203.

The power supply controlling unit 203 charges the rechargeable battery 204 based on the DC voltage applied from the rectification smoothing circuit 202. Note that the power supply controlling unit 203 detects the status of the rechargeable battery 204 based on the voltage of the rechargeable battery 204, the charging time, and the like, and controls the supply of power to the rechargeable battery 204. The rechargeable battery 204 is, for example, a lithium-ion secondary battery or lithium-hydrogen secondary battery capable of storing power by charging.

In the power supply communication unit 201, the communication circuit 403 detects the electromotive force generated in the secondary coil by a magnetic flux pattern for signal transfer which is generated by the power supply communication unit 101, and transmits information superimposed on the magnetic flux pattern to the communication controlling unit 205. If the received information is a predetermined command, the communication controlling unit 205 returns a response to the command. In addition, the communication controlling unit 205 sends predetermined data to the power supply communication units 101 to 104 of the power-supplying device 100 via the power supply communication unit 201, as needed. In this case, the power supply communication unit 201 can cause the communication circuit 403 to generate, in the secondary coil, a magnetic flux pattern by superimposing predetermined response information or predetermined data on the power, supplied from the power-supplying device 100 and temporarily stored, by using the power supply controlling unit 203. The power-supplying device 100 generates an electromotive force in the primary coil 401 of the power supply communication unit 101 in accordance with the magnetic flux pattern generated by the power supply communication unit 201, and detects a change in electromotive force via the communication circuit 403, thereby receiving the superimposed information.

Figure 5A:
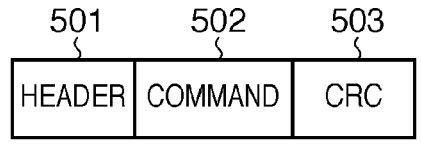
FIGS. 5A, 5B, and 5C are views each showing an example of a packet structure at the time of communication according to this embodiment.

Packet structures in communication of information using the excitation of the coil described above will be described below with reference to FIG. 5A to 5C. FIG. 5A is a view showing the packet structure of a command sent from the power-supplying device 100 to a power-supplied device.

As shown in FIG. 5A, a command sent from a power-supplying device to a power-supplied device is constituted by a header field 501, a command field 502, and a CRC field 503. The header field 501 is constituted by a start bit, a device ID, an identification number which is a number assigned to each command to be paired with a response and serves to identify the response, and a command length defining the length of the command. The command field 502 stores a command number for identifying a GetStatusu command, a GetInfo command, a GetCapability command, or the like. The CRC field 503 (Cyclic Redundancy Check) stores data for checking whether the data of the header field 501 and command field 502 are correct.

In this case, the GetStatus command is a command for inquiring a power-supplied device whether it can communicate and can be charged currently. The GetInfo command is a command for inquiring a power-supplied device about the present current/voltage status and the charged status (the charge ratio). The GetCapability command is a command for obtaining allowable amount information associated with power supply, for example, the allowable voltage/current of a power-supplied device. The information obtained from a power-supplied device by the GetInfo command the GetCapability command is power supply information including an allowable amount associated with power supply and a power supply amount indicating the charge ratio. Note that the device ID contained in the header field 501 is used to identify the device to which the command is to be transmitted, and is issued as a broadcast command when the GetInfo command is to be transmitted.

Figure 5B:
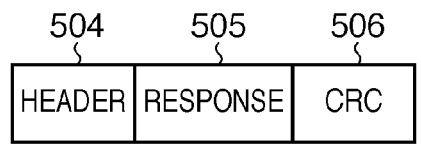

FIG. 5B is a view showing the packet structure of a response which a power-supplied device transmits in response to a command transmitted from a power-supplying device to the power-supplied device. As shown in FIG. 5B, a response to a command transmitted to a power-supplied device is constituted by a header field 504, a response field 505, and a CRC field 506.

The header field 504 is constituted by a start bit, an identification number for identifying the response to the received command, a response length defining the length of the response, and the like. The response field 505 stores a response number for determining an ACK response indicating the reception of a command, a NACK response indicating the rejection of a command, or the like. The CRC field 506 stores data for checking whether the data of the data of the header field 504 and response field 505 are correct.

Figure 5C:
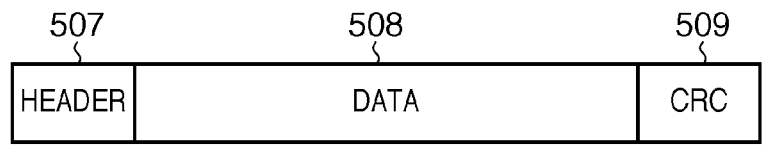

FIG. 5C is a view showing the packet structure of data transmitted from a power-supplying device to a power-supplied device. As shown in FIG. 5C, data transmitted to a power-supplied device is constituted by a header field 507, a data field 508, and a CRC field 509.

The header field 507 is constituted by a start bit, a data length defining the length of data, and the like. The data field 508 stores predetermined data corresponding to a command. The CRC field 509 stores data for checking whether the data of the header field 507 and data field 508 are correct.

Note that when such a command is to be transmitted, the communication circuit 403 of the power supply communication unit generates a command as a magnetic flux pattern from the coil of a corresponding device. The magnetic flux pattern generated in the coil of one device generates an electromotive force in the coil of the other device. Detecting this electromotive force makes it possible to receive a command.

Figure 6A:
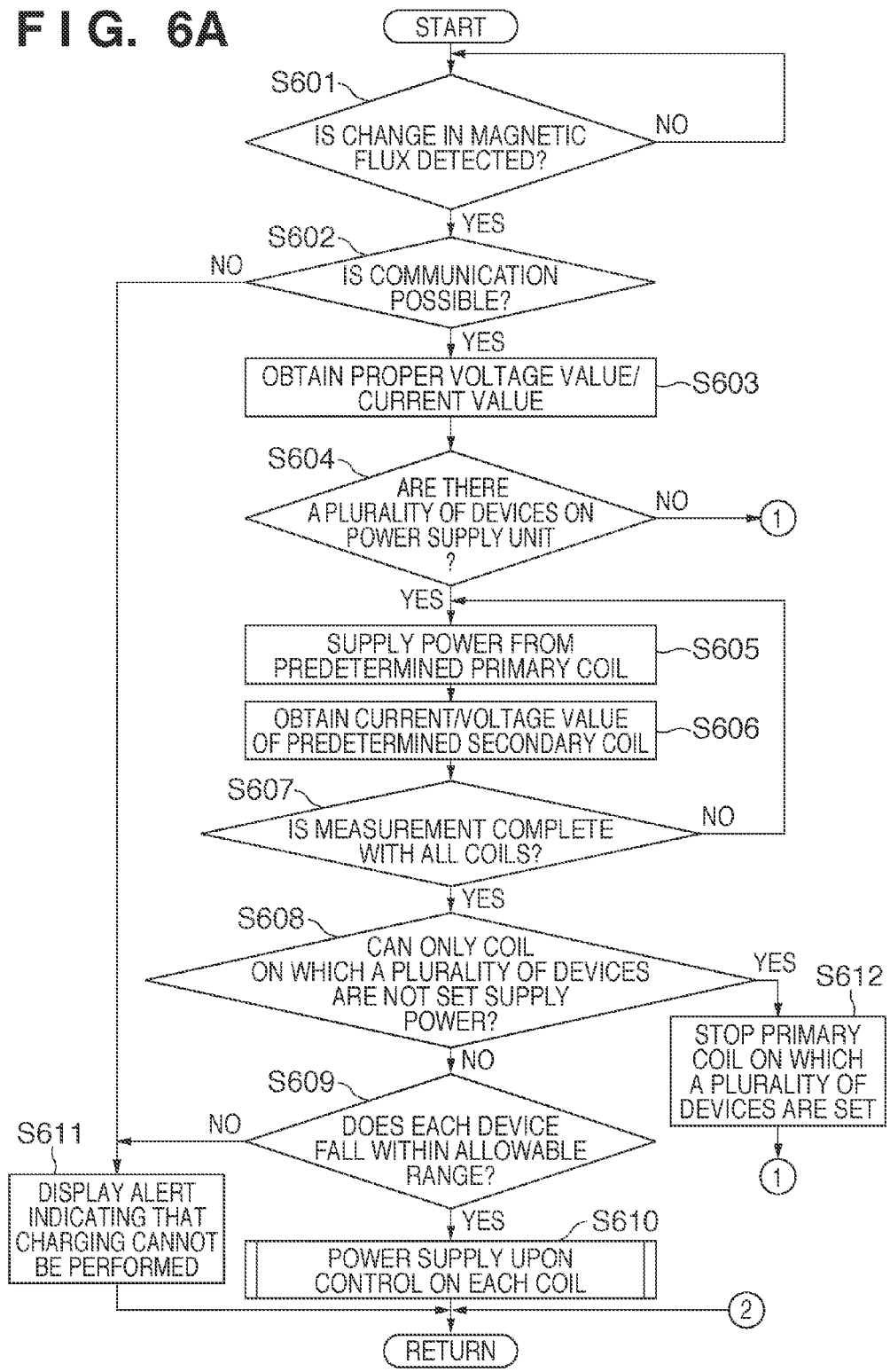

A processing procedure in the power-supplying device 100 according to this embodiment will be described below with reference to FIGS. 6A and 6B. As shown in FIGS. 6A and 6B, when the processing starts, the power supply communication controlling unit 108 determines whether the sensor unit 110 including the magnetic sensor 121 to 124 has detected a change in magnetic flux (S601). In this determination in step S601, the power supply communication controlling unit 108 detects that any device are set on the power supply communication units 101 to 104.

Upon detecting that some devices are set in the power supply areas of the power supply communication units 101 to 104, the power supply communication controlling unit 108 stops driving the resonance circuits of the power supply communication units 101 to 104. The power supply communication controlling unit 108 then determines whether it can communicate with the detected devices (S602). The determination about the capability of communication is performed by causing the power supply communication units 101 to 104 set near those of the magnetic sensors 121 to 124 which have detected the devices to issue the GetStatus command for inquiring the devices whether they can communicate, under the control of the power supply communication controlling unit 108. As described above, the power supply communication controlling unit 108 issues this command by driving the communication circuit 403 to generate a magnetic flux pattern corresponding to the GetStatus command from the primary coil 401 in the power supply communication units 101 to 104. If there is no response to this command, the power supply communication controlling unit 108 determines that the devices set in the power supply areas of the power supply communication units 101 to 104 cannot communicate. That is, the power supply communication controlling unit 108 determines that the devices set in the power supply areas of the power supply communication units 101 to 104 are not power-supplied devices which are compatible with power supply from the power supply communication units 101 to 104. If, therefore, there is no response to the GetStatus command, the power supply communication controlling unit 108 sends a control instruction for the execution of displaying alert indication to the display controlling unit 111. The display controlling unit 111 then causes the LED 112 or the LCD 113, under the control of the power supply communication controlling unit 108, to display the alert indication to indicate that the devices cannot be charged, thereby notifying the user of the corresponding information (S611).

In contrast, if the devices set in the power supply areas of the power supply communication units 101 to 104 can communicate and correspond to the power-supplying device 100, the communication circuit 403 of the power supply communication unit of each power-supplied device returns a response indicating that a command has been received. That is, the communication circuit 403 of each power-supplied device generates a magnetic flux pattern on which response data is superimposed in the secondary coil of the power-supplied device, thereby transmitting a response to the power-supplying device 100. The power supply communication controlling unit 108 receives the response data by detecting the electromotive force generated in the primary coil 401 of any of the power supply communication units 101 to 104 via the communication circuit 403. Upon receiving the response data, the power supply communication controlling unit 108 interprets the response data. After the interpretation of the response data, the power supply communication controlling unit 108 obtains power supply information such as the proper voltage and current value of each of the power-supplied devices set in the power supply areas of the power supply communication units 101 to 104 and the DeviceID and VendorID of the power-supplied device (S603).

More specifically, the power supply communication controlling unit 108 causes the communication circuit 403 of a predetermined power supply communication unit to generate the GetCapability command from the primary coil 401 to obtain the proper voltage and current value of each of the power-supplied devices set in the power supply areas of the power supply communication units 101 to 104 and DeviceID and VendorID of the power-supplied device. After the power-supplied device which has received the GetCapability command returns a response, the communication controlling unit 205 of the power-supplied device causes the power supply communication unit 201 to transmit the proper voltage and current value of the power-supplied device and the data of DeviceID and VendorID of the power-supplied device to the power-supplying device 100. Note that the power supply communication controlling unit 108 temporarily stores, in its internal memory, the proper voltage and current value of the power-supplied device and the data of DeviceID and VendorID of the power-supplied device, which have been received by one of the power supply communication units 101 to 104.

An example of the power supply information obtained from power-supplied devices and stored in the memory will be described with reference to FIG. 7. As shown in FIG. 7, the data obtained from power-supplied devices are stored in the memory in correspondence with the respective devices, for example, a digital camera 801 and a cellular phone 802. The memory stores, as power supply information of each device, the data obtained from each power-supplied device, including a device name 803, a maker name 804, an allowable voltage value (MIN) 805, an allowable voltage value (MAX) 806, an allowable current value (MIN) 807, and an allowable current value (MAX) 808.

Upon obtaining data from power-supplied devices, the power supply communication controlling unit 108 determinates whether a plurality of power-supplied devices are set in the power supply area of one power supply communication unit, as shown in FIG. 2 (S604). That is, in step S604, the power supply communication controlling unit 108 detects whether any one of the power supply communication units 101 to 104 is ready for supplying power to a plurality of power-supplied devices. Whether power-supplied devices are set in the power supply area of one power supply communication unit can be determined by performing communication from each of the power supply communication units 101 to 104 and determining whether the respective power supply communication units receive responses from a plurality of power-supplied devices. In step S604, therefore, if one power supply communication unit receives responses from a plurality of power-supplied devices, the power supply communication controlling unit 108 determinates that a plurality of power-supplied devices are set in the power supply area of one power supply communication unit.

If a plurality of power-supplied devices are not set in the power supply area of one power supply communication unit, the power supply communication controlling unit 108 issues power supply instructions to the power supply communication units, which have detected the respective power-supplied devices, to start power supply from the primary coils 401 of the respective devices to the power-supplied devices (S613). Note that this power supply instruction is issued based on the information of the allowable current/voltage obtained in step S603 to control the power (supply power amount) supplied from the primary coil so as not to exceed the allowable current/voltage of each power-supplied device. That is, the power supply communication controlling unit 108 controls the resonance circuit 402 in the power supply communication unit to excite the primary coil 401 so as to supply power within the range of the allowable current/voltage of the power-supplied device set in the power supply area of each power supply communication unit.

The power supply communication controlling unit 108 then controls the communication circuit 403 of the power supply communication unit to send the GetInfo command from the primary coil 401 of the power supply communication unit which is performing non-contact power supply. The power supply communication controlling unit 108 then obtains, from each power-supplied device, the information of the present current, present voltage, and charged status as a response to the transmitted command (S614). The power supply communication controlling unit 108 determines a proper voltage value and current value from the information of the current, voltage, and charged status obtained from each power-supplied device. The power supply communication controlling unit 108 then causes the resonance circuit 402 to change the setting of the magnetic flux for power supply generated in the primary coil 401 of the power supply communication unit on which the power-supplied device is set, so as to generate a proper voltage value and current value in the secondary coil of the power-supplied device (S615).

Based on the power supply information obtained in step S614, the power supply communication controlling unit 108 then determines whether the charged status of the power-supplied device is in a FULL (fully charged) status, and charging is complete (S616). If the charged status is not a FULL status, the power supply communication controlling unit 108 returns the process to step S613 to continuously execute the processing in steps S613 to S615.

If the charged status is a FULL status, the power supply communication controlling unit 108 controls the resonance circuit 402 of the power supply communication unit which is supplying power to the power-supplied device, so as to stop supplying power to the power-supplied device whose charged status is a FULL status. The power supply communication controlling unit 108 notifies the user of information indicating the completion of charging, including information specifying a device, via the display controlling unit 111 using the LED 112 and the LCD 113 (S617).

After the notification, the power supply communication controlling unit 108 determinates whether the charged statuses of the power-supplied devices set on all the power supply communication units are the FULL status, and charging of all the power-supplied devices is complete (S618). Upon determining that charging of all the power-supplied devices is complete, the power supply communication controlling unit 108 terminates the power supply processing. Upon determining that charging of all the power-supplied devices is not complete, the power supply communication controlling unit 108 controls the resonance circuit 402 to stop supplying power from the primary coil 401 in the power supply communication unit which is supplying power to the power-supplied device which has been fully charged (S619). Thereafter, the power supply communication controlling unit 108 returns the process to step S613 to continue power supply to the power-supplied device which has not been fully charged.

Upon determining in step S604 that a plurality of power-supplied devices are set on one power supply communication unit like, for example, the power supply communication unit 103 in FIG. 2 (are set in the power supply area), the power supply communication controlling unit 108 controls the resonance circuit 402 to start supplying power from the power supply communication units 101, 103, and 104 on which the power-supplied devices are set (S605). The power supply communication controlling unit 108 then obtains the information of the current, voltage, and charged status of each power-supplied device during charging via the communication circuit 403 of the power supply communication unit which is supplying power, as in step S614 (S606). The power supply communication controlling unit 108 determines whether the processing in steps S605 and S606 has been executed for all the power supply communication units on whose power supply areas the power-supplied devices are set. If the power supply communication controlling unit 108 determines that the processing has been executed for all the power supply communication units, the process shifts to step S608. Otherwise, the power supply communication controlling unit 108 repeatedly executes the processing in steps S605 and S606 (S607).

Based on the power supply information obtained in steps S605 to S607, the power supply communication controlling unit 108 calculates how much power can be supplied to each power-supplied device with the power supplied from each power supply communication unit. Based on the calculation result, the power supply communication controlling unit 108 then determines whether only power supply communication units on which the plurality of power-supplied devices are not set can independently perform non-contact power supply to the respective power-supplied devices (S608). More specifically, in the case shown in FIG. 2, for the digital camera 200, the power supply communication controlling unit 108 determines, based on the information of the current, voltage, and charged status during charging when only the power supply communication unit 101 supplies power, whether power supply can be performed. For the cellular phone 300, the power supply communication controlling unit 108 determines, based on the information of the current, voltage, and charged status during charging when only the power supply communication unit 104 supplies power, whether power supply can be performed.

Upon determining in step S608 that a power supply communication unit other than a power supply communication unit on which a plurality of power-supplied devices are set can supply sufficient power to each power-supplied device, the power supply communication controlling unit 108 controls the resonance circuit 402 so as to stop supplying power from the primary coil 401 of the power supply communication unit on which the plurality of power-supplied devices are set (S612). Upon stopping power supply from the primary coil of the power supply communication unit on which the plurality of power-supplied devices are set, the power supply communication controlling unit 108 shifts the process to step S613 to continue the processing. Note that a series of processes from step S613 are the same as those described above.

If the power supply communication controlling unit 108 determines in step S608 that sufficient power cannot be supplied to the respective power-supplied devices without power supply from the power supply communication units on which the plurality of power-supplied devices are set, the process advances to step S609. In step S609, the power supply communication controlling unit 108 calculates a current/voltage value supplied to each power-supplied device, including power supplied from the power supply communication units on which the plurality of power-supplied devices are set, based on the power supply information obtained in steps S605 to S607. The power supply communication controlling unit 108 determines whether the calculated current/voltage value supplied to each power-supplied device satisfies the allowable voltage/current value of each power-supplied device obtained in step S603. More specifically, the current/voltage value supplied to one power-supplied device is expressed by the sum of current/voltage values supplied from the respective power supply communication units, on which the one power-supplied device is set, to the one power-supplied device, which are obtained by the processing in steps S605 to S607. That is, the power supply communication controlling unit 108 determines in step S609 whether the sum of the current/voltage values which can be supplied from the power supply communication units including the one on which the plurality of power-supplied devices are set exceeds the lower limit value of the allowable range of currents and voltages of the plurality of power-supplied devices.

If the power supply communication units including the one on which the plurality of power-supplied devices are set cannot supply power corresponding to the allowable voltage/current value of each power-supplied device, the power supply communication controlling unit 108 sends a control instruction for displaying the alert indication to the display controlling unit 111. With this operation, the power-supplying device 100 causes the display controlling unit 111 to display the alert indication that the devices cannot be charged, using the LED 112 and the LCD 113, thereby notifying the user of the corresponding information (S611).

If the power supply communication units including the one on which the plurality of power-supplied devices are set can supply power corresponding to the allowable voltage/current value of each power-supplied device, the power supply communication controlling unit 108 controls each power supply communication unit to supply power to each power-supplied device (S610), and terminates the processing.

Figure 8:
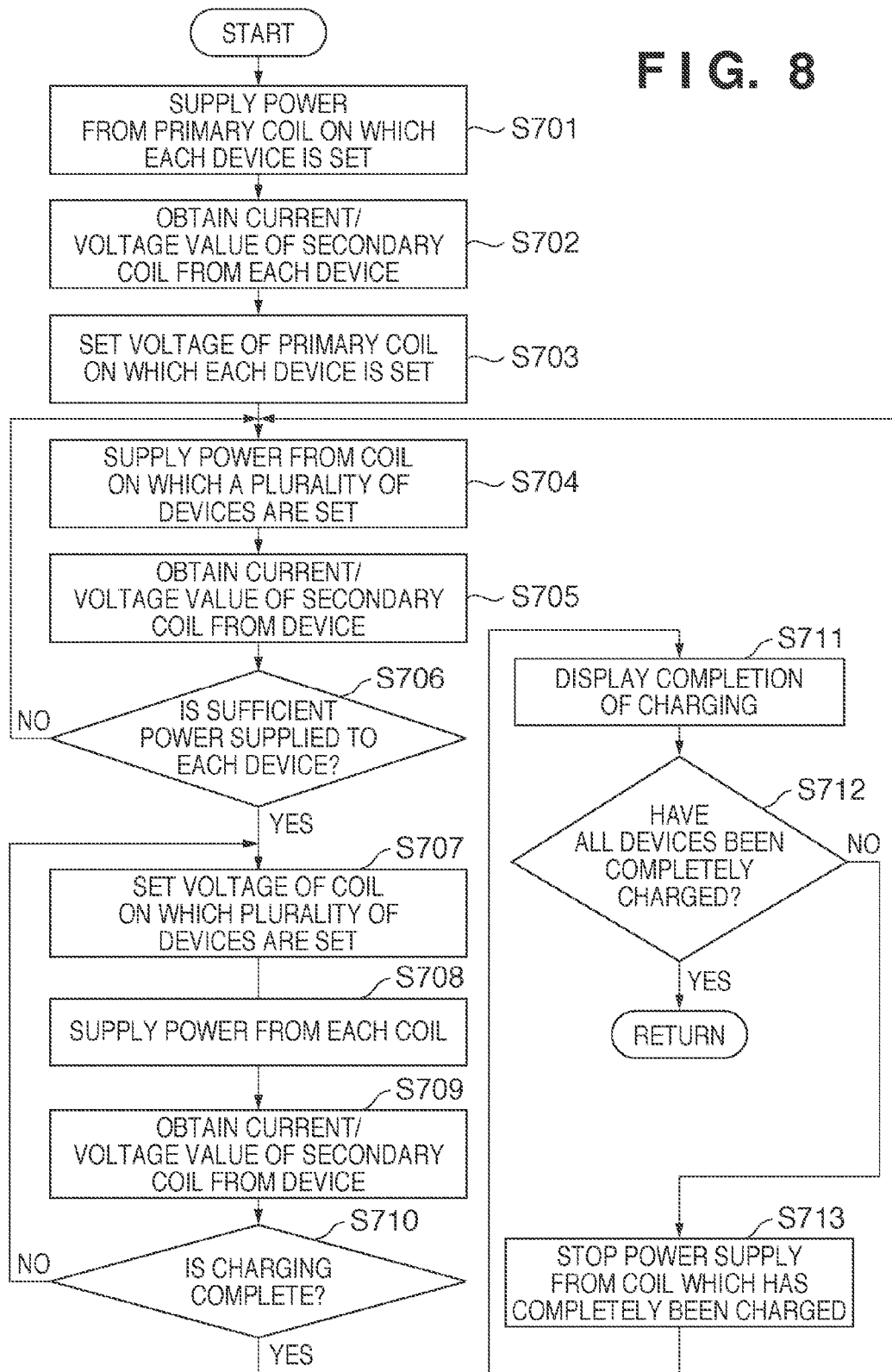
FIG. 8 is a flowchart showing power supply processing which is processing performed by the power-supplying device according to this embodiment in a case in which a plurality of power-supplied devices are set on one power supply communication unit.

Power supply processing to be performed when a power supply communication unit on which a plurality of power-supplied devices are set also supplies power in step S610 will be described below with reference to FIG. 8. As shown in FIG. 8, when the processing starts, the power supply communication controlling unit 108 transmits a power supply instruction to a power supply communication unit on which a plurality of power-supplied devices are not set, based on the information of the allowable current/voltage obtained in step S603, thereby starting power supply from the primary coil 401 (S701). Thereafter, the power supply communication controlling unit 108 causes the the communication circuit 403 of a predetermined power supply communication unit to transmit a magnetic flux pattern corresponding to the GetInfo command from the primary coil 401, and obtains the information of the present current, voltage, and charged status from each power-supplied device (S702).

The power supply communication controlling unit 108 then sets the voltage of the power supply communication unit on which a plurality of power-supplied devices are not set, so as to supply a proper amount of power to each power-supplied device (S703). More specifically, the power supply communication controlling unit 108 sets a voltage value that allows the power-supplied device to obtain power sufficient for charging within the allowable voltage/current value, based on the information of the current, voltage, and charged status obtained in step S702 and the allowable voltage/current value of the power-supplied device which is obtained in step S603.

The power supply communication controlling unit 108 then starts supplying power from the power supply communication unit on which a plurality of power-supplied devices are set (S704). As in step S702, the power supply communication controlling unit 108 obtains the information of the present voltage, current, and charged status from each power-supplied device by using the GetInfo command (S705).

Based on the power supply information obtained in step S705, the power supply communication controlling unit 108 determinates whether the plurality of power-supplied devices set on one power supply communication unit fall within the range of the allowable voltage/current value and are in a proper charged status (S706). Upon determining in step S706 that the power-supplied devices are not in a proper charged status, the power supply communication controlling unit 108 returns the process to step S704 to increase the power if it is small or to decrease the power if it is large, thereby adjusting the power supplied to the power supply communication unit on which the plurality of power-supplied devices are set. By repeating the processing in steps S704 to S706 in this manner, the power supply communication controlling unit 108 finds a proper setting for the amount of power to be supplied from the power supply communication unit on which the plurality of power-supplied devices are set.

Upon finding a setting for the supply of proper power that satisfies an allowable voltage/current for each power-supplied device (YES in step S706), the power supply communication controlling unit 108 sets the power to be supplied from the power supply communication unit on which the plurality of power-supplied devices are set (S707). Upon completing this setting, the power supply communication controlling unit 108 transmits a power supply instruction for performing main charging to each power supply communication unit on which a power-supplied device is set, thereby starting power supply (S708).

The power supply communication controlling unit 108 then obtains the information of the current/voltage value and charged status of each power-supplied device during power supply as in step S705 (S709), and determines whether there is any power-supplied device which has been completely charged (S710). If there is no power-supplied device which has been completely charged, the power supply communication controlling unit 108 repeatedly performs the processing in steps S707 to S709. If there is a power-supplied device which has been completely charged, the power supply communication controlling unit 108 sends a control instruction for displaying to the display controlling unit 111. And then, the display controlling unit 111 displays an indication, which the power-supplied device has been completely charged, by using the LED 112 or the LCD 113 (S711).

The power supply communication controlling unit 108 then determines whether all the power-supplied devices have been completely charged (S712). If all the power-supplied devices have been completely charged, the power supply communication controlling unit 108 terminates the processing. If all the power-supplied devices have not been completely charged, the power supply communication controlling unit 108 stops power supply and communication from the power supply communication unit on which only the power-supplied devices which have been completely charged are set (S713). Assume that the power supply communication controlling unit 108 does not stop power supply from the power supply communication unit on which the plurality of power-supplied devices are set.

The power supply communication controlling unit 108 then returns the process to step S704 to continue the processing in steps S704 to S706 to make a check to find a proper setting for the amount of power to be supplied from the power supply communication unit on which the plurality of power-supplied devices are set. That is, if one of the plurality of power-supplied devices set on one power supply communication unit has been completely charged, the power supply communication controlling unit 108 brings the power closer to the minimum value of the allowable voltage/current value of the completely charged power-supplied device and checks whether the power-supplied devices to which power is being supplied can be further charged. The power supply communication controlling unit 108 performs power supply according to the series of processes in steps S707 to S710 with the amount of power set by this check. Performing the above power supply processing allows the power-supplying device 100 according to this embodiment to charge the rechargeable batteries of a plurality of power-supplied devices even if they have different allowable voltage/current values. This embodiment has exemplified non-contact power supply using the electromagnetic induction scheme. However, the present invention can be applied to the magnetic field resonance scheme (magnetic resonance scheme) and the radio wave transmission scheme. The magnetic field resonance scheme uses the principle that causing magnetic field variations with a predetermined period on the primary coil side will generate an electromotive force in the secondary coil of a power-supplied device having a resonance frequency matching the predetermined period. That is, in the magnetic field resonance scheme, controlling the magnitude of magnetic field variations caused by a power-supplying device can control the amount of power to be supplied to a power-supplied device.

Note that the description of the above embodiment is an example. The present invention is not limited to this. The arrangement and operation of the above embodiment can be changed as needed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-117041, filed May 13, 2009, and No. 2010-104233, filed Apr. 28, 2010, which are hereby incorporated by reference herein in their entirety.

The invention claimed is:

1. A power-supplying device including a plurality of primary coils comprising:
   a power supply unit configured to supply power in a non-contact manner from at least one of the plurality of primary coils to at least one power-supplied device set in a power supply area of at least one of the plurality of primary coils;
   a detecting unit configured to detect whether a plurality of power-supplied devices are set in the power supply area of one of the plurality of primary coils; and
   a controlling unit configured to control the power supply unit to stop supplying power from the one of the plurality of primary coils on which the plurality of power-supplied devices are detected to be set, when the detecting unit detects that the plurality of power-supplied devices are set in the power supply area of the one of the plurality of primary coils.

2. The device according to claim 1, further comprising a communication unit configured to obtain allowability information associated with power supplied to the at least one power-supplied device by communicating with the at least one power-supplied device set in the power supply area of at least one of the plurality of primary coils,
   wherein the controlling unit controls the power supply unit to supply power from the plurality of primary coils, other than the one of the plurality of primary coils on which the plurality of power-supplied devices are detected to be set, to at least one of the plurality of power-supplied devices based on the allowability information obtained by the communication unit.

3. The device according to claim 2,
   wherein the controlling unit determines whether power supplied by the power supply unit to at least one of the plurality of power-supplied devices set on the primary coil falls within an allowable range of voltage and current determined based on the allowability information, when the power supply unit is stopped supplying power from the one of the plurality of primary coils on which the plurality of power-supplied devices are detected to be set, and the controlling unit controls the power supply unit to resume supplying power from the one of the plurality of primary coils, when determining that the power supplied to at least one of the plurality of power-supplied devices set on the one of the plurality of primary coils falls outside the allowable range.

4. The device according to claim 3, further comprising an alert unit configured to issue an alert when the power supplied to at least one of the plurality of power-supplied devices falls outside the allowable range determined based on the allowability information.

5. A control method for a power-supplying device comprising a power supply unit, including a plurality of primary coils, configured to supply power in a non-contact manner from at least one of the plurality of primary coils to at least one power-supplied device set in a power supply area of at least one of the plurality of primary coils, characterized by comprising:

a detecting step of detecting whether a plurality of power-supplied devices are set in the power supply area of one of the plurality of primary coils; and a controlling step of controlling the power supply unit to stop supplying power from the one of the plurality of primary coils on which the plurality of power-supplied devices are detected to be set, when it is detected in the detection step that the plurality of power-supplied devices are set in the power supply area of the one of the plurality of primary coils.

6. The method according to claim 5, characterized by further comprising a communication step of obtaining allowability information associated with power supplied to the at least one power-supplied device by communicating with the at least one power-supplied device set in the power supply area of at least one of the plurality of primary coils, wherein in the controlling step, the power supply unit is controlled to supply power from the plurality of primary coils, other than the one of the plurality of primary coils on which the plurality of power-supplied devices are detected to be set, to at least one of the plurality of power-supplied devices based on the allowability information obtained in the communication step.

7. The method according to claim 6, characterized in that in the controlling step, it is determined whether power supplied by the power supply unit to at least one of the plurality of power-supplied devices set on the primary coil falls within an allowable range of a voltage and current determined based on the allowability information, when the power supply unit is stopped supplying power from the one of the plurality of primary coils on which the plurality of power-supplied devices are detected to be set, and the power supply unit is controlled to resume supplying power from the one of the plurality of primary coils, when it is determined that the power supplied to at least one of the plurality of power-supplied devices set on the one of the plurality of primary coils falls outside the allowable range.

8. The method according to claim 7, characterized by further comprising an alert step of issuing an alert when the power supplied to at least one of the plurality of power-supplied devices falls outside the allowable range determined based on the allowability information.

9. A power-supplying system comprising a power-supplying device and at least one power-supplied device, wherein the power-supplying device comprises a plurality of primary coils, a power supply unit configured to supply power in a non-contact manner from at least one of the plurality of primary coils to the at least one power-supplied device set in a power supply area of at least one of the plurality of primary coils, a detecting unit configured to detect whether a plurality of power-supplied devices are set in the power supply area of one of the plurality of primary coils, and a controlling unit configured to control the power supply unit to stop supplying power from the one of the plurality of primary coils on which the plurality of power-supplied devices are detected to be set, when the detecting unit detects that the plurality of power-supplied devices are set in the power supply area of the one of the plurality of primary coils, and the at least one power-supplied device each comprises power receiving unit including a secondary coil which receives power supplied from the power supply unit when the power-supplied device is set on any of the plurality of primary coils.

10. The device according to claim 1, wherein the controlling unit controls the power supply unit to supply power from the plurality of primary coils, other than the one of the plurality of primary coils on which the plurality of power-supplied devices are detected to be set, to at least one of the plurality of power-supplied devices.

11. The method according to claim 5, wherein in the controlling step, the power supply unit is controlled to supply power from the plurality of primary coils, other than the one of the plurality of primary coils on which the plurality of power-supplied devices are detected to be set, to at least one of the plurality of power-supplied devices.

* * * * *